United States Patent [19]

Zaslavsky et al.

[11] 4,276,077

[45] Jun. 30, 1981

[54] LIGNOSULFONATE-BASED GRAFT POLYMERS THEIR PREPARATION AND USES

[75] Inventors: Dan Zaslavsky; Lev V. Rozenberg, both of Haifa, Israel

[73] Assignee: Technion Research and Development Foundation Ltd., Technion City, Israel

[21] Appl. No.: 108,823

[22] Filed: Dec. 31, 1979

Related U.S. Application Data

[63] Continuation-in-part of Ser. No. 866,936, Jan. 4, 1978, abandoned.

[30] Foreign Application Priority Data

Dec. 18, 1975 [IL] Israel .................................... 48686
Nov. 2, 1977 [IL] Israel .................................... 53288

[51] Int. Cl.³ .......................... C05G 3/04; C05G 3/02
[52] U.S. Cl. ................................... 71/64 SC; 71/65; 71/77; 71/79; 260/17.5; 47/9; 47/DIG. 10; 405/264; 424/358
[58] Field of Search ...................... 71/1, 3, 11, 23, 27, 71/64 SC, 65, 77, 79; 260/17.4 GC, 17.5, 124; 47/9, DIG. 10, 58; 405/264

[56] References Cited

U.S. PATENT DOCUMENTS 3,370,935  2/1968  Adams et al. ............. 260/17.4 G X Primary Examiner—S. Leon Bashore
Assistant Examiner—Ferris H. Lander

[57] ABSTRACT

The present invention relates to a method for improving a soil structure by stabilization of aggregates and to the reagents used therefor. The reagents used are graft polymers obtained from crude lignosulfonate and monomer selected from the group consisting of vinyl cyanide (acrylonitrile), vinyl acetate, hydrolized vinyl acetate and acrylamide or combinations thereof, at a pH range of between 2 and 6 in the presence of an initiator.

The reagents obtained according to the invention are true solutions and are characterized by their low viscosity. They can be used in solution, emulsion or suspension either by spraying alone or admixed with fertilizers, pesticides or combined with the operation of planting and soil stabilization.

The reagents can be easily manufactured, being stable for prolonged periods of time. They possess outstanding properties as soil conditioners.

21 Claims, 1 Drawing Figure

One Sheet Only

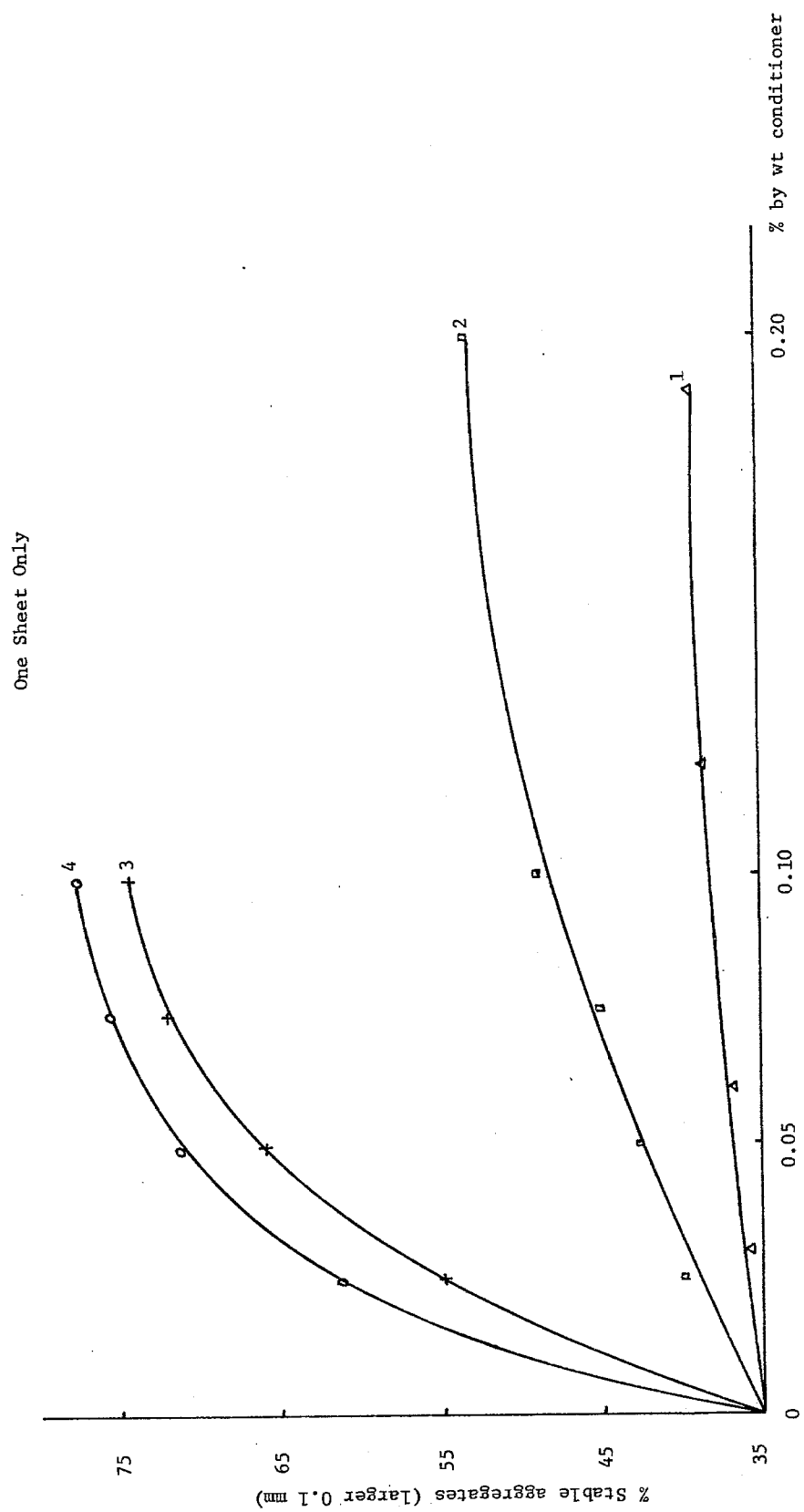

LIGNOSULFONATE-BASED GRAFT POLYMERS THEIR PREPARATION AND USES

This is a continuation-in-part application of Ser. No. 866,936 filed Jan. 4, 1978 and now abandoned entitled Lignosulfonate-based graft polymer, their preparation and uses.

The present invention relates to raft polymers for improving soil structure and to methods for their manufacture. More particularly the invention relates to graft polymers obtained from lignosulfonate and certain particular vinyl monomers, for improving soil structure and to methods for their manufacture.

Soil structure is the organization of particles in space. It is specifically a result of soil aggregates, their size, shape and properties. It can be characterized by aggregate analysis of size, distribution and stability. An improved structure will be beneficial to the prevention of erosion by water, increase in crop yields etc. It also simplifies the mechanical preparation of the field before planting. An increase in aggregate size and in percent of aggregates will reduce wind erosion. It will also reduce a high penetration of rain into the soil and will improve water holding capacity and reduce evaporation, the result of which is a better water balance in arid zones. Of special importance is the prevention of crust formation due to puddling by rain drops. Prevention of this puddling, allows for a better rain infiltration into the soil and causes a reduction of run-off with a consequent erosion decrease. The prevention of crust following puddling improves germination and aeration of saplings.

It has been postulated that the differences in structure between the undesirable and the desirable types of soils are attributable to differences in the type of the electrical charges of the individual soil particles. Accordingly, it has been proposed to condition or to improve poor soils, for example structurally undesirable clayey and loam soils, by adding soil conditioners, which are substituting to some extent the natural organic matter lacking in many soils. They can fluocculate individual small particles into large ones. In particular it has been suggested to use certain synthetic polyelectrolytes which are water soluble, partially water soluble or water insoluble. These are mainly based on polyacrylamides, polymethacrylonitriles, copolymers of acrylonitriles with vinyl acetate etc. Thus for example U.S. Patent 2,625,471 claims a copolymer containing 80-84% acrylonitrile, 11-15% methacrylonitrile and 5% vinyl acetate, and hydrolysed in order to make it hydrophilic. These polymers are characterized by their high molecular weight of at least 10,000. Nothing is mentioned in the specification of this patent on grafting at all. U.S. Pat. No. 2,847,392 describes a copolymer containing 50% methacrylonitrile and 50% butadine. U.S. Pat. No. 2,765,290 claims a modification of polymethacrylonitrile; after hydrolysis to the acidic form, the polymer is absorbed on to the surface of vermiculite particles and used in this form as soil conditioner.

Although these polyelectrolytes have been used successfully in a number of limited applications, such as house gardening, they have not become widespread due to one or more of the following reasons:

(a) They are too expensive for large scale use.
(b) The strength of bonds holding the particles of soil in an aggregate is too high and thus detrimental for certain properties.
(c) Very often they appear in a powder form, which causes problems in their storage and is very inefficient in field application.
(d) Some of them have toxic properties for animals and human beings.
(e) Some of them are easily decomposed by bacteria present in the soil.
(f) Some of them are not sufficiently stable even for a complete season, being readily decomposable and washed out.

Some references are encountered describing the use of lignosulfonate as soil conditioner. Some improved results are claimed to be achieved in obtaining soil aggregates using amounts of about 2% or more by weight lignosulfonate. However, such relatively large amounts of lignosulfonate become expensive in application as well as in manipulation and also raise problems concerning the bacterial activites in the soil. Also the high lignosulfonate concentration affects the soil chemical properties important for plant nutrition. The lignosulfonate is leached through the soil and thus is wasted to a large extent; it also penetrates to certain layers where it is not needed and may even be harmful and cause problems of contamination. Large amounts of lignosulfonate also tend to produce a massive structure rather than the friable aerated structure desirable in most soils for agricultural purposes. The lignosulfonates may become irreversibly disactivated by some multivalent cations and at the same time when applied in large amounts deprive the plants from some of the necessary microelements.

A method for improving soil structure is claimed in a Russian Pat. No. 492,261, (see Chemical Abstracts, Vol. 84, 1976, 73052) one of the inventors of the present invention (L. Rozenberg) being among the co-inventors therein, wherein "the structure former is a graft copolymer of lignosulfonate with acrylic acid esters, the complex ester groups of which are 30-100% saponified". By reviewing the entire specification of said Russian Patent it can be noticed that the only acrylic monomer specificed therein is methyl acrylate. Neither the abstract from C. A. nor the specification does mention anything on the pH at which said graft copolymerization is obtained. A systematic study made by the inventors of the present invention has shown that certain vinylic monomers do not form at all graft polymers with lignosulfonate, while others which are capable of reacting to form such polymers do not improve the soil structure.

In the U.S. Pat. No. 3,873,487, water insoluble polymeric soil conditioners are disclosed. These polymers are obtained by flocculating an initial water soluble reaction product with a synthetic organic polymer having a molecular weight of about 500,000 to 10,000,000.

According to Japanese Pat. No. 51-39925 spraying compositions as soil stabilizers are claimed. These compositions are obtained by blending of seed, fertilizer, crude cellulose and lignin-sulfonic acid with an aqueous solution containing polyacrylamide. No example is given in the patent on the use of the soil stablizers.

Other types of soil conditioners based on modified cellulosic fibers are disclosed in U.S. Pat. No. 3,370,935. These compounds are obtained from a cellulosic fibrous material on which a hydrolized polymer is deposited at a pH of about 7 and subsequently treated with an acrylic monomer followed by the partial or complete hydrolysis of the product.

Other types of soil conditioners based on the interaction of lignin-sulfonate with alkanolamine are described in the U.S. Pat. No. 4,018,591. The interaction between the reagents is occurring at an alkaline medium, the product having the characteristic of being capable of absorbing oxygen and evolving ammonia when exposed to air. Graft polymers are well known in the art using various back-bones with a large numbe of monmers. These graft copolymers have been found to posses useful properties in various fields. Thus for instance in according with U.S. Pat. No. 3,095,391 vinylic monomers are graft polymerized on an amylaceous material in the absence of air, in the presence of an oxidizing catalyst and a reducing agent as an activator. The uses suggested for these graft polymers are: sizing compounds for synthetic fibers and paper, adhesives and flocculants.

Driling fluid compositions based on graft copolymers of lignosulfonate and polyacrylate having a molecular weight of at least 100,000 are claimed in the U.S. Pat. No. 3,985,659. As known in the art of driling, there is a requirement to maintain the particles in suspension, and for this reason these fluids should have a proper viscosity in order to impart a thixotropic character to the system.

In our copending Patent Application Ser. No. 953,799, soil conditioners were provided which were made by the graft polymerization of an acrylic monomer and crude lignosulfonate at a critical pH range of 1 to 4 in the presence of an initiator. According to the present invention it has been found that other monomers can be successfully utilized in order to manufacture new soil conditioners. Thus the invention consists of soil conditioners which are produced by the graft polymerization of crude lignosulfonate with a monomer selected from the group consisting of vinyl cyanide (acrylonitrile), vinyl acetate, hydrolized vinyl acetate and acrylamide or combinations thereof, at a pH range of between 2 and 6, in the presence of an initiator.

One of the main objects of the soil conditioners according to the present invention is to improve the soil structure by stabilizng aggregates. This is contrary to the effect obtained by other materials, which cause soil solidification i.e. increased soil strength.

Among the advantages of the new soil conditioners, the following can be mentioned: (1) Their manufacture is very simple, (2) they are relatively inexpensive, (3) the amount of the vinylic monomer in the graft polymer may be small. Thus for example it was found that, instead of using equal parts by weight of said vinylic monomer and crude lignosulfonate, even only one part of said vinylic monomer to 6or 8 parts of crude lignosulfonate can be used, depending on the type of soil required to be conditioned and the specific goal desired. For example, for conditioning a soil in order to protect it from erosion by rain and to prevent crust formation, it has been found that a graft polymer containing 0.6 parts vinyl acetate and 1 part lignosulfonate gave almost the same results as a graft polymer prepared from 1 part vinyl acetate and 1 part lignosulfonate. Of course the latter graft polymer, containing as it does more of the vinylic component, will be relatively more expensive than the former one. A higher vinylic component in the graft polymer results in a soil conditioner with a higher molecular weight and stronger bonds with the soil.

The graft copolymerisation of the said vinylic monomers with the lignosulfonate is an exothermic reaction which occurs at a pH in the range of 2 to 6 and preferably 3 to 5. It was found that the above pH range is very critical having a great influence on the extent of reaction as well as to the composition of the product in order to obtain the reagent with the required properties as soil conditioner. Thus when the reaction is carried out at a pH above 6, the extent of the monomer grafting on the lignosulfonate sharply decreases with the consequence that large amounts of monomer will remain in the product. On the other hand, at pH below 2 the reaction is very exothermic being practically impossible to be controlled due to precipitation and agglomeration of solid particles. The products obtained according to the present invention possessing the required properties as soil conditioners are true solutions having a relatively low viscosity, whereas these obtained at a different pH range are very viscous. The pH adjustment is carried out either by the addition of an alkali such as sodium hydroxide, when the mixture of the reagents has an acidic character or by adding an acid such sulphuric acid in case that the mixture of the reagents has an alkaline character. In the latter case it is most preferable to adjust the pH by incorporating acrylic acid which is further graft polymerized on the lignosulfonate.

A person skilled in the art after reading the present specification will select the proper ratio between the lignosulfonate and the particular vinylic monomer in order to obtain the soil conditioner most suitable for the purpose required. It is also possible to use a mixture of two or more graft polymers prepared separately with different monomers or different monomers or different ratios between lignosulfonate and vinylic monomers. In this manner each conditioner in the mixture will act on the soil according to its composition, for the specific goal. For example if the conditioner is to be sprayed, one may use a mixture of two types. One type would be of a higher molecular weight for stronger bonds at the surface. The other may be of a lower molecular weight to improve the penetration below the surface.

Conditioners of different compositions may form better bonds with different constituents in the soil. For example, graft polymers with acrylonitrile, methyl acrylate or both, form better bonds with particles of $CaCO_3$ while a graft polymer with acrylic acid is just as good with fine enough silica and clay minerals.

According to a preferred embodiment of the present invention, it is possible to polymerize the crude lignosulfonate with two or more vinylic monmers in the same reactor. The two or more vinylic monomers may be introduced either together, whereby the graft polymerization occurs simultaneously or separately, whereby the graft polymerizations with each monomer will occur consequently. There are cases, for example, when vinyl acetate is utilized, where the polymerization should be carried out in an atmosphere of nitrogen in order to prevent any possible inhibition by oxidation of the monomer. These are common expedients known to any person skilled in the art of polymerizing such monomers.

It is also possible to mix two graft polymers: one prepared according to our copending Patent Application Ser. No. 953,799 using acrylic or methacrylic acid as monomer, with a graft polymer obtained according to the present invention.

The term "crude lignosulfonate" as used in the present specification, includes the aqueous solution resulting from the processing of plants or wood for the separation of cellulose and lignosulfonic acid or salts thereof as obtained without any purification. the constitution of the crude lignosulfonate varies depending on the type of plant or wood utilized and on the method of processing;

it appears generally in the form of $Na^+$, $NH_4^+$ or $Ca^{++}$ salts along with other polysaccharides, which for certain uses are harmful and have to be removed. It has been found that the lignosulfonate salts to be utilized in the method according to the present invention, may be in the crude form, which is also less expensive than the purified form, without impairing the activity per unit weight of the soil conditioner. Furthermore, experiments with certain materials indicated higher activity per unit weight of a soil conditioner produced from crude lignosulfonate; it goes however without saying that purified polysaccharide - free lignosulfonate, often also referred to as lignosulfonic acid or lignosulfonate salts may also be utilized.

The graft polymerization between the vinylic monomer and the lignosulfonate is a simple addition reaction which occurs at a critical pH in the range of 2 to 6 and preferably in the range of 3 to 5. The product obtained is stable and even after more than one year of storage, no change in its structure or in the results obtained from its utilization were observed. The soil conditioners obtained may be dried for example by spray dryer and stored or used in a powder form.

The graft polymers obtained in accordance with the present invention are used preferably in their hydrophilic form which required hydrolysis of the polymer, for which the known methods with an alkaline solution such as NaOH, KOH, $ca(OH)_2$ or $NH_4OH$ are used. Where the graft polymer used includes acrylic acid, methacrylic acid, or hydrolyzed vinyl acetate, as one of the monomers, which already possess a hydrophilic character, only partial hydrolysis may or mere neutralization will be sufficient. Before hydrolysis it can be obtained as an emulsion with a relatively good stability.

The initiator required to be present in the graft polymerization, can be selected from known reagents used in this type of reaction e.g. hydrogen peroxide or various organic peroxides such as cumene hydroperoxide. It is also possible to initiate the polymerization reaction by purely physical means, such as ultraviolet radiation.

The monomers used in the present invention selected from vinyl cyanide, vinyl acetate, hydrolized vinyl acetate and acrylamide may be utilized such as are commerically available without any prior treatment (e.g. distilling out the inhibitors generally used for their storage). A person skilled in the art on polymerization will select the proper reagent for performing the graft polymerization, making use of the available commodities and reagents.

Compared with the known polyelectrolytes based on acrylonitrile copolymers, as described in the prior art, the new soil conditioners according to the present invention, are claimed to be much superior, being characterized by the followig improved properties:

1. They have a long shelf life without special storage precautions such as dry atmosphere, darkness or oxygen-free atmosphere.

2. The moleculr weight of the graft polymer according to the present invention is reduced and therefore the number of effective bonds per unit weight of soil conditioner is increased facilitating a more uniform spreading of the conditioner through the soil and thus a greater efficiency.

3. The graft polymer is more soluble and thus less sensitive to possible further polymerization or setting with time.

4. The bonds formed between the new conditioner and the soil are strong enough for maintaining an aggregate of the proper magnitude, but not too strong so as to cause the formation of large soil clods or too strong clods or not sufficiently permeable to permit adequate movement of water, air and nutrients into the soil treated.

5. The bonds formed are at least partially regenerative, which means that the aggregate property of the soil persists even after several cycles of rain, drying and working of the soil.

6. The graft polymers are water soluble or may be produced as stable suspensions and can be easily transferred and diluted.

7. The hydrolysed graft polymers are not sensitive to solutions of many electrolytes even at high concentrations which enables use of water of various qualities.

8. They are practically non-toxic.

9. Most of them can be diluted to any extent and sprayed without problems of clogging the nozzles or pipes.

10. The properties of the soil conditioners may be changed by varying the proportions between the monomers and lignosulfonate as well as the extent of hydrolysis.

Concerning the production of the new soil conditions, the process involved is characterized by the following advantages:

1. The main component, lignosulfonate, is a low cost raw material which today is an environmental burden.

2. The process does not require the removal of the inhibitors from the vinylic monomers, as generally encountered in such graft polymerization.

3. When emulsions are desirable to be prepared, no additional surface active agents or organic solvents are required.

4. The reaction occurs at ambient temperatures and in most of the cases at atmospheric pressure. Generally the reaction time is about 5 minutes at a temperature of between 30° to 95° C.

5. The polymerization of the monomers is almost complete leaving only traces of monomer in the end product.

6. Tap water or even water with a higher salts content may be utilized.

The application of the soil conditioners prepared in accordance with the present invention can be done by the known methods. When used in the solid form, it can be mixed with the soil or spread mechanically, watering and if necessary reworking the mixture. When used as an aqueous solution, the soil conditioner is simply mixed with the wet soil. The soil conditioner may be also applied together with irrigation water. The amount of soil conditioner to be given will vary from soil to soil in accordance with the goal envisaged; thus for example, for a loess-type soil, improved results in the structure, such as increased aggregation, were obtained by using between 0.025% and 0.1% by wt of the soil. Higher amounts of soil conditioner, up to 0.2% by wt (on a dry basis) will further increase the proportion of stable aggregates, but this will generally not be economically attractive. For soil strengthening in construction work however, higher amounts may be recommended.

A preferred method for the application of the new soil conditioner, which is much simpler than the above known ways, is by spraying the aqueous solution directly on the soil. This method of application for soil conditioning has become possible, thanks to the particular properties of the copolymer obtained according to the present invention.

It has been found that the conditioner sprayed on to the soil forms a protective layer which prevents aggregate breakage by action of raindrops or wind erosion. The rate of water infiltration into the soil is maintained, preventing the formation of an impermeable crust by the impact of raidrops. It also improves the regeneration of infiltration capacity after drying and thus helps in the germination of seeds.

It has been found that by repeated spraying, drying and shallow cultivation, an excellent protective mulch layer is produced which is well aerated, reduces the evaporation from the soil and thus retains the water, and leads to markedly improved crop yields. This has a special importance where crust formation is detrimental and water supply is limited.

Instead of using aqueous solutions, the hydrolyzed graft polymer obtained according to the present invention, may be sprayed admixed with an aqueous fertilizer such as ammonia solution. In this manner the incorporation of the soil conditioner is carried out at the same time as the fertilizer application, thus saving additionally an agrotechnical operation. In a similar manner it is also possibel to incorporate the soil conditioner in various pesticides or herbicides and apply to the soil together with these.

According to another embodiment of the present invention, the soil conditioning apparatus can be mounted on various soil working implements and especially on the planting machines. This apparatus consists of devices for spreading the conditioner either in powder form or preferably in an aqueous solution on to the soil. The soil with which the seeds are covered, will already contain the conditioner reagent and thus will retain good water infiltration and good aeration prospects even after heavy rains or irrigation. This combined operation of simultaneous planting and soil stabilization can be carried out by the simple addition of the appropriate nozzles in front of, besides or behind the planting tool. Generally speaking, the amount of soil conditioner needed is about 20 and 50 kg. per hectare of soil. Large amounts can be used with better results however are less attractive from an economical point of view. It has been found that the application of the new soil conditioner can also be carried out on an area of limited extent in strips, or on patches of soil. Better results are obtained with larger water dilution and in humid soil.

The improved results of soil conditioning obtained with the graft polymers according to the present invention were substantiated both in laboratory and in field tests, and much better results as regards the stability of aggregates than those obtained with a known acrylic polymer (manufactured and marketed by Monsanto under the Trade Mark of "Krylium") were achieved. It was found that the benefical effect of the new soil conditioners on aggregate formation appears even with a very low percentage of soil conditioner produced according to the present invention.

FIG. 1illustrates in graphic form the percentage of stable aggregates larger than 0.1 mm (by wet sieving) in a loess type soil obtained, as a function of the percentage (by wt) of conditioner used. For comparison, corresponding tests were perfomred with crude lignosulfonate —given in Graph 1—and with the same "Krylium" given in Graph 2. The improved results of the new soil conditioner are self-evident. Whereas with an amount of 0.05% by wt lignosulfonate or Krylium, the stable aggregates were 37% and 43% respectively, the stable aggregates were 67% and 72% (Graphs 3, 4) when using the same amount of conditioner prepared according to the present invention. In graph 3 the soil conditioner consists of a graft polymer of 0.5 part methyl acrylate, 0.5 part acrylonitrile and 1 part lignosulfonate 15% (by wt) while in Graph 4 it consists of the same acrylate and acrylonitrile compositions but the lignosulfonate was of a 25% (by wt) concentration.

A good illustration of the various effects obtained by the soil conditioers according to the present invention can be presented by sedimentation tests carried out on different soils. An amount of ground soil was added to water resulting in a suspension of 150 mls. To the suspension obtaied, an amount of 100 mls of a solution of soil conditioner was added, thus resulting in a total slurry of 250 mls of suspended soil. The sedimentation tests measurements were done according to the settling of the suspension and the relatively clear water layer formed at the top. The readings given in the following Tables are in mm of the settling material from its bottom to the settling level.

TABLE 1

| Wt concentration of soil conditioner in 0/00 of the soil | Readings of sediments at different times (in minutes) | | | | | | | | | Final reading after 18 hrs. | % new soil sediment formed |
|---|---|---|---|---|---|---|---|---|---|---|---|
| | 0 | 0.5 | 1.0 | 1.5 | 2.0 | 3.0 | 4.0 | 5.0 | 10 | | |
| 5.0 | 250 | 210 | 181 | 157 | 140 | 110 | 94 | 85 | 67 | 50 | 28.2 |
| 2.0 | 250 | 210 | 178 | 148 | 124 | 100 | 89 | 83 | 68 | 52 | 33.3 |
| 1.0 | 250 | 212 | 178 | 148 | 124 | 102 | 92 | 85 | 69 | 50 | 28.2 |
| 0.75 | 250 | 214 | 182 | 154 | 130 | 105 | 94 | 86 | 70 | 49 | 25.6 |
| 0.5 | 250 | 222 | 195 | 172 | 152 | 119 | 102 | 92 | 72 | 47 | 20.5 |
| 0.25 | 250 | 226 | 206 | 186 | 170 | 143 | 122 | 105 | 74 | 45 | 15.4 |
| 0.1 | 250 | 232 | 216 | 202 | 188 | 162 | 142 | 125 | 77 | 43 | 10.3 |
| 0 | 250 | 250 | 250 | 250 | 250 | 250 | 250 | 250 | 230 | 39 | 0 | thus adding a 2°/$_{oo}$ solution of the soil conditioner caused an increase of 33.3% in volume of the soil, with a corresponding increased porosity, and produced a better germination and growth in crop than the untreated soil. Each soil will require a different optimal amount of soil conditioner in order to achieve the highest sediment. At lower concentrations of the soil conditioner, the flocculation effect will be more enhanced, the velocity of settling depending on the size of aggregates and their bulk density.

The soil conditioner prepared according to Example 4 was also tested with a standard kaolin soil. The settling measurements are given in the following Table 2:

TABLE 2

Use of the soil conditioner prepared in Example 4 with a standard kaolin soil

| Wt concentration of soil conditioner in 0/00 of the soil | Readings of sediments at different times (in minutes) | | | | | | | | | Final reading after 18 hrs. | % new soil sediment formed |
|---|---|---|---|---|---|---|---|---|---|---|---|
| | 0 | 0.5 | 1.0 | 1.5 | 2.0 | 3.0 | 4.0 | 5.0 | 10.0 | | |
| 2.0 | 250 | 170 | 102 | 73 | 63 | 52 | 47 | 43 | 36 | 26 | 36.8 |
| 1.0 | 250 | 160 | 92 | 71 | 62 | 53 | 48 | 45 | 38 | 27 | 42.1 |
| 0.75 | 250 | 170 | 98 | 76 | 67 | 56 | 51 | 47 | 39 | 28 | 47.4 |
| 0.50 | 250 | 180 | 110 | 81 | 70 | 59 | 53 | 49 | 40 | 27 | 42.1 |
| 0.25 | 250 | 204 | 150 | 106 | 84 | 68 | 61 | 55 | 44 | 26 | 36.8 |
| 0.1 | 250 | 214 | 180 | 146 | 116 | 80 | 66 | 60 | 45 | 24 | 26.3 |
| 0 | 250 | 250 | 250 | 250 | 250 | 250 | 250 | 250 | 240 | 19 | 0 |

Thus adding 0.75°/oo of the soil conditioner caused an increase of 47.4% in volume of the soil with a corresponding increased porosity and better germination than the untreated soil.

The same soil conditioner prepared in Example 4, was tested with a loess type soil, and the settling measurements obtained are given in the following Table 3:

TABLE 3

Use of the soil conditioner prepared in Example 4 with a loess type soil.

| Wt concentration of soil conditioner in 0/00 of the soil | Readings of sediments at different times (in minutes) | | | | | | | | | Final reading after 18 hrs. | % new soil sediment formed % |
|---|---|---|---|---|---|---|---|---|---|---|---|
| | 0 | 0.5 | 1.0 | 1.5 | 2.0 | 3.0 | 4.0 | 5.0 | 10.0 | | |
| 1.00 | 250 | 164 | 107 | 83 | 74 | 67 | 65 | 64 | 63 | 62 | 19.2 |
| 0.75 | 250 | 166 | 107 | 83 | 74 | 67 | 65 | 64 | 63 | 62 | 19.2 |
| 0.50 | 250 | 170 | 108 | 83 | 74 | 67 | 65 | 64 | 61 | 60 | 15.4 |
| 0.25 | 250 | 162 | 105 | 80 | 72 | 64 | 61 | 60 | 59 | 58 | 11.5 |
| 0.10 | 250 | 180 | 112 | 87 | 74 | 64 | 60 | 58 | 56 | 55.5 | 6.7 |
| 0 | 250 | 250 | 250 | 250 | 250 | 250 | 250 | 150 | 220 | 52.0 | 0 |

Here again it was found that the addition of 0.75°/oo of the soil conditioner caused an increase of 19.2% in volume of the soil with a corresponding increased porosity, and produced a better germination and growth in crop than the untreated soil.

The soil conditioer prepared as in Example 5 was tested with a kaolin soil and the settling measurements obtained are given in the following Table 4:

TABLE 4

Use of the soil conditioner prepared in Example 5 with a kaolin soil.

| Wt concentration of soil conditioner in o/oo of the soil | Readings of sediments at different times (in minutes) | | | | | | | | | Final reading after 18 hrs. | % new soil sediment formed % |
|---|---|---|---|---|---|---|---|---|---|---|---|
| | 0 | 0.5 | 1.0 | 1.5 | 2.0 | 3.0 | 4.0 | 5.0 | 10.0 | | |
| 2.0 | 250 | 202 | 154 | 112 | 85 | 64 | 56 | 51 | 39 | 22 | 15.8 |
| 1.0 | 250 | 198 | 142 | 96 | 76 | 62 | 55 | 50 | 40 | 24 | 26.3 |
| 0.75 | 250 | 198 | 143 | 98 | 78 | 64 | 56 | 52 | 41 | 24.5 | 28.9 |
| 0.5 | 250 | 204 | 154 | 112 | 85 | 68 | 59 | 54 | 42 | 24 | 26.3 |
| 0.25 | 250 | 212 | 174 | 140 | 110 | 78 | 66 | 58 | 44 | 23.5 | 23.7 |
| 0.1 | 250 | 222 | 100 | 154 | 136 | 93 | 71 | 62 | 46 | 22 | 15.8 |
| 0 | 250 | 250 | 250 | 250 | 250 | 250 | 250 | 250 | 240 | 19 | |

Thus the addition of 0.75°/oo of the soil conditioer caused an increase of 28.9% in volume of the soil with a corresponding increased porosity, and produced a better germination and growth in crop than the untreated soil.

Another illustration of the beneficial effects of the soil coditioners according to the present invention, can be presented by the prevention of wind erosion. Thus for example an amount of 3 g of the soil conditioner (prepared as in Example 4) sprayed on to sandy areas with 200 to 1000 mls of water per square meter, provided protection against wind erosion about one month after seedling of carrots. It also improved their germination by about 25%.

A similar test carried out with a loess type soil utilizing 5 g/sq. meter of the soil conditioner (prepared as in Example 4) improved germination of carrots with about 20%. Run-off of irrigation water due to crust formation was practically prevented up to a total of 200 mm rain.

Wind tunnel field tests on various wind velocities were carried out with several soils from northern Jordan Valley (Israel) until incipient erosion was noticed. The soil conditioner was applied at a rate of 5 g per square meter in 500 mls of water. The results obtained were measured 15 cm above the soil and are given in the following Table 5:

TABLE 5

| Soil type | Peat Soil | Marle soil (Lacustrine) | Peat soil | Peat soil (Hulla Lake) | Peat soil (Hulla Lake) | Peat soil (Hulla Lake) |
|---|---|---|---|---|---|---|
| Wind velocity in km/hr, with treated soil | 60 | 85 | 55 | 55 | 50 | 55 |
| Wind velocity in km/hr, with untreated soil | 28 | 35 | 30 | 34 | 36 | 36 |

The results show evidently the benefit of the treated soil with the soil conditioner according to the present invention. For example whereas with a lacustrine soil only at a velocity of 85 km/hr. incipient erosion was noticed for a treated soil, the same incipient erosion with an untreated soil was already observed at a velocity of 35 km/hr. only.

In order further and more fully to illustrate the nature of this invention and the manner of practising it, the following Examples are presented for clearness of understanding only, and no limitation should be understood therefrom. The amounts used are expressed in parts by weight unlss otherwise stated.

EXAMPLE 1

100 parts of crude lignosulfonate (containing polysaccharides as obtained from the paper industry) were introduced into a reactor (provided with a stirrer a thermometer, and a condenser) together with 300 parts of tap water. The pH of the mixture was about 3.5. Subsequently, 42 parts of vinyl cyanide (known under the name of acrylonitrile) were added and the mixture heated to about 50° C. Then 2 parts of hydrogen peroxide (10% by volume) were added and an exothermic reaction was observed. The reaction was kept going at 70° C. for a few minutes. The product obtained was hydrolysed to an extent of 50% by heating for two hours at 85°-90° C. with 105 parts of NaOH solution (30% by wt). The end product in the form of a brown colloidal solution was found to be a good soil conditioner when applied in a concentration of 0.1% by weight to a clayey soil, resulting in 46.4% of water stable aggregates (larger than 0.1 mm).

EXAMPLE 2

In this Example 400 parts of the same aqueous solution of crude lignosulfonate, as that used in Example 1 at the pH of about 3.5, were graft polymerized first with 25 parts of methyl acrylate and subsequently with 75 parts of vinyl cyanide. The conditions of polymerization were the same as in Example 1. The product obtained was found to be a good soil conditioner; applied in a concentration of 0.1% by weight to a clayey soil, it gave 52% of stable aggregates (larger than 0.1 mm). The same product after complete hydrolisation with NaOH (as in Example 1) yielded a soil conditioner which gave 74.1% stable aggregates (larger than 0.1 mm) when applied at the same concentration of 0.1% by wt of the soil.

EXAMPLE 3

The experiment was similar to that described in Example 1 but instead of 42 parts vinyl cyanide (acrylonitrile), 50 parts of methyl acrylate and 50 parts of vinyl cyanide were introduced together for the graft polymerization with the crude lignosulfonate solution at a pH of about 4. The product obtained was completely hydrolised with NaOH as in Example 1 and tested as a soil conditioner. The following stable aggregates (by wt sieving larger than 0.1 mm) were obtained at various amounts of soil conditioners:

| | 0.05% by wt of soil | 0.075% by wt of soil | 0.1% by wt of soil |
|---|---|---|---|
| Stable aggregates | 65.5 | 69.0 | 71.8 |

EXAMPLE 4

The experiment as in Example 3 was repeated with the same amounts but the graft polymerization was performed with 50 parts of methyl acrylate followed by 50 parts of vinyl cyanide at the same pH. The product obtained was divided into two batches, the first being hydrolysed to an extent of 50% (50% of the esters groups) and the second completely hydrolysed. The end products were tested as soil conditioners and the results, expressed as a percentage of stable aggregates obtained were as follows:

| | Stable Aggregates by wet sieving (larger than 0.1 mm) | | |
|---|---|---|---|
| | 0.05% by wt of soil | 0.075% by wt of soil | 0.1% by wt of soil |
| 50% hydrolysed | Not determined | Not determined | 70.6 |
| 100% hydrolysed | 65.8 | 71.5 | 77.8 |

EXAMPLE 5

150 parts of crude lignosulfonate were introduced into a reactor as in Example 1, together with 850 parts of tap water. After adjusting the pH to about 3.6 with the aid of NaOH (30% by wt). 20 parts of unhydrolysed vinyl acetate and 80 parts of methyl acrylate were added together and the polymerization performed in an atmosphere of nitrogen. The results expressed as percentages of stable aggregates obtained in a clayey soil using the resulting graft polymer were as follows:

| | Stable Aggregates by wet sieving (larger than 0.1 mm) |
|---|---|
| | 0.1% by wt of soil |
| Unhydrolysed | 62.7 |
| 50% hydrolysed | 61.2 |
| 100% hydrolysed | 62.9 |

EXAMPLE 6

The experiment as in Example 1 was repeated using the same amount of crude lignosulfonate and tap water. Subsequently 50 parts of acrylic acid were added the pH being about 3, and the mixture polymerized. This was followed by an additional 50 parts of vinyl cyanide and the mixture further left to polymerize. The unhydrolysed product obtained, was tested for soil aggregates formation (set sieving larger than 0.1 mm) and found to give 58.9% stable aggregates when applied at 0.1% by wt of the soil.

EXAMPLE 7

100 parts of crude lignosulfonate were introduced into reactor (provided with a stirrer, a thermometer and a condenser) together with 400 parts of tap water. The pH of the mixture was about 3.5. After that 25 g of methyl acrylate were added and the mass heated at 56° C. in the presence of 30 mls of a 5% hydrogen peroxide. The temperature raised to 85° C. and the temperature of the reactor was kept in the range of 85°–95° C. for about five minutes. The product obtained was in particular suitable as aggregating agent for soil.

For certain uses the results obtained with reagents according to the present invention are superior to these obtained according to our previous patent application Ser. No. 953,799 when acrylic acid or methacrylic acid were used. Thus for instance for stabilizing sand, the use of emulsions of the reagents obtained according to the present invention will give better results than with a graft polymer of lignosulfonte - acrylic acid. The graft polymer being water soluble might be washed out prior to obtain the desired effect of sand stabilization. In general the reagents according to the present invention are more versatile and can be selected for each specific use. In the following two Examples (A and B), some comparative results on sedimentation tests and stable aggregates formation carried out with acrylic acid-lignosulfonate graft polymer are given.

EXAMPLE A.

A graft polymer of acrylic acid and crude lignosulfonate prepared under the same conditions as that described in Example 1 was used in sedimentation tests at a rate of 1°/oo of a calcareous clayish soil. The readings of sediments at different times (minutes) are compared below with those obtained with the same soil, with the graft polymer obtained in Example 4, as appears in Table 1 (at the same rate).

|  | Readings of sediments at different times (minutes) | | | | | | | | | Final reading after 18 hrs. |
|---|---|---|---|---|---|---|---|---|---|---|
|  | 0 | 0.5 | 1 | 1.5 | 2.0 | 3.0 | 4.0 | 5.0 | 10 |  |
| Acrylic acid-lignosulfate graft polymer | 250 | 225 | 221 | 210 | 180 | 160 | 140 | 130 | 100 | 30 |
| Methyl acrylate vinyl cyanide-Lignosulfonate graft polymer | 250 | 212 | 178 | 148 | 124 | 102 | 92 | 85 | 69 | 50 |

It clearly appears the better aggregation effect obtained with the reagent according to the present invention than that obtained with acrylic acid-lignosulfonate polymer, since a higher reading of sediment means a lower aggregation effect.

EXAMPLE B.

The percentage of stable aggregates determined in Example 3 obtained with a graft polymer according to the present invention at the rates of 0.05%, 0.075% and 0.1% are compared below with a graft polymer of acrylic acid-lignosulfonate as in the previous application Ser. No. 953,799.

|  | % Stable aggregates by wt sieving larger than 0.1 mm | | |
|---|---|---|---|
|  | 0.05% by wt of soil | 0.075% by wt of soil | 0.1% by wt of soil |
| Reagent according to the present invention (Example 3) | 65.5 | 69.0 | 71.8 |
| Acrylic acid-lignosulfonate | 52.5 | 62.5 | 65.0 |

As already mentioned in the specification, one of the main objects of the soil conditioners obtained according to the present invention is yo improve the soil structure and particularly the bulk soil properties. Once these properties are improved, a number of other properties will be positively effected. Among these properties the following can be mentioned: hydraulic conductivity, infiltration and drainage rate increase, increased porosity with an improved aeration which will cause an increase in crops of various plants such as potatoes, carrots, onions beets etc.

The U.S. Pat. No. 3,370,935 (hereinbefore acknowledged) mentions indeed in Example 21 the conditioning of clay soil causing a reduction of 15–25% in the clay density by using a wood pulp containing 40–50% polyacrylonitrile as reagent. In fact the reduced density is due to the presence of the fiber in said reagent. It should in particular be pointed out the definition of the reagent as "0.10% wt. of the treated fiber in clay" (column 13 line 4) which clearly indicates that a pulp containing modified cellulosic fibers is the ingredient according to said patent. This contrary to the aqueous solution of lignosulfonate used according to the present invention, which under a certain critical pH range will graft copolymerize with a limited number of vinyl monomers, producing the aqueous true solutions as soil conditioners reagents. No grafting polymerization at all is encountered in the reagents disclosed in said U.S. Patent.

We claim:

1. A soil conditioner produced by the exothermic reaction of graft polymerization of crude lignosulfonate with a monomer selected from the group consisting of vinyl cyanide, vinyl acetate, hydrolized vinyl acetate and acrylamide or combinations thereof at a pH range of between 2 and 6 in the presence of an initiator.

2. A soil conditioer produced in accordance with claim 1, wherein the lignosulfonate utilized is substantially free of polysaccharides.

3. A soil conditioner produced in accordance with claim 1, wherein the pH range is between 3 to 5.

4. A soil conditioner produced in accordance with claim 1, wherein said graft polymerization of the crude lignosulfonate is carried out simultaneously with two or more of the said monomers.

5. A soil conditioner produced in accordance with claim 4, wherein the graft polymerization of the crude lignosulfonate is carried out with one of said monomers and an acrylic monomer.

6. A soil conditioner produced in accordance with claim 5, wherein the ratio between the vinylic and acrylic monomer together to the lignosulfonate is in the range of 1:0.8 to 1:8.

7. A soil conditioer produced in accordance with claim 4, wherein the graft polymerization of the crude lignosulfonate is carried out first with one monomer followed by a graft polymerization with another monomer.

8. A soil conditioner produced in accordance with claim 1, wherein the weight ratio between the vinylic monomer and lignosulfonate is in the range of 1:0.8 to 1:8.

9. A soil conditioner produced in accordance with claim 1, wherein the pH adjustment is carried out with acrylic acid.

10. A soil conditioner produed in accordance with claim 1, wherein the initiator used is of the peroxide type.

11. A soil conditioner produced in accordance with claim 10, wherein the peroxide used is selected from the group consisting of cumene hydroperoxide and hydrogen peroxide.

12. A soil conditoner produced in accordance with claim 1, wherein the soil conditioner obtained is subsequently partially or totally alkaline hydrolised.

13. A soil conditioner produced in accordance with claim 12, wherein the alkaline hydrolysis is performed with an aqueous solution of NaOH, KOH, Ca(OH)$_2$ or NH$_4$OH.

14. A soil conditioner produced in accordance with claim 1, wherein the product is dried to a powder.

15. A method for improving the soil structure by stabilization of aggregates which consists in the application of a soil conditioner obtained according to claim 1.

16. A method according to claim 15, carried out by spraying.

17. A method according to claim 15, carried out simultaneously with the fertilizer application.

18. A method according to claim 15, carried out in combination with application of pesticides or herbicides.

19. A method according to claim 15, carried out simultaneously with the planting of seeds.

20. A method according to claim 15, carried out in combination with spreading of seeds and solid mulching materials.

21. A method according to claim 15, carried out through the irrigation water.

* * * * *